United States Patent Office 3,536,796
Patented Oct. 27, 1970

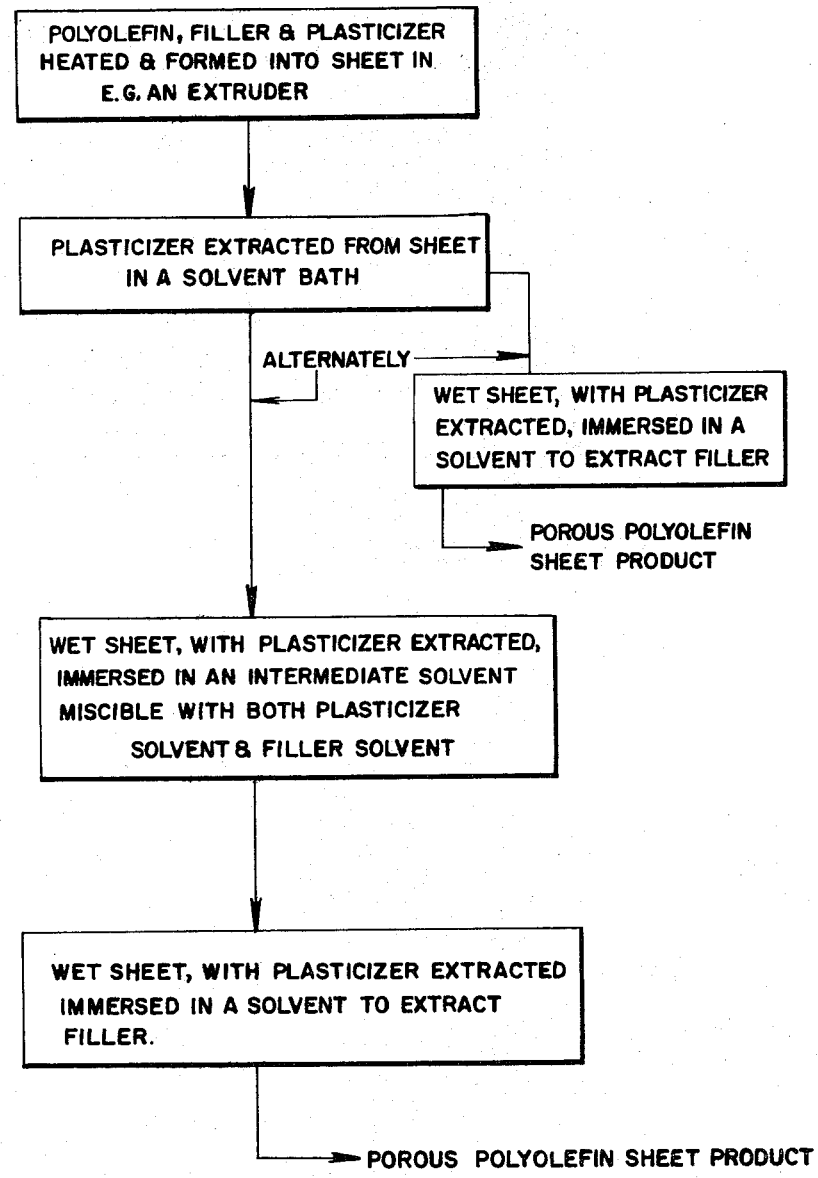

3,536,796
PROCESS FOR REDUCING SHRINKAGE IN PREPARING POROUS PLASTIC SHEET
Michael Rock, Randallstown, Md., assignor to W. R. Grace & Co., New York, N.Y., a corporation of Connecticut
Filed Nov. 29, 1967, Ser. No. 686,679
Int. Cl. B29d 7/02, 27/00
U.S. Cl. 264—49                                    7 Claims

ABSTRACT OF THE DISCLOSURE

A process for reducing shrinkage in preparing a porous sheet for wet applications. A sheet is formed from a fluxed mixture composed of 5 to 65 volume percent of polyolefin having a standard-load melt index of 0, 5 to 60 volume percent filler, and the difference between the total amount of polyolefin and filler and 100 volume percent being plasticizer, the amount of plasticizer being at least 30% by weight. The sheet is immersed in a solvent for the plasticizer and the plasticizer is extracted. The resulting wet extracted sheet is immersed in a solvent for the filler and the filler is extracted.

---

The instant process produces sheets with minimal shrinkage. These porous sheets are suitable for use as battery separators in alkaline-type batteries.

The art teaches that a useful microporous sheet of a polyolefin is produced from a uniform mixture of filler, plasticizer, and polyolefin having a standard-load melt index of 0, by milling or calendering the mixture into a sheet, and extracting from the sheet the filler and the plasticizer with suitable solvents. The extraction process is normally carried out by immersing the sheet in a solvent for the plasticizer for a period of time sufficient to extract the plasticizer and allowing the extracted sheet to dry in air. The dried sheet is then immersed in a solvent for the filler, the filler is extracted, and the resulting extracted sheet is dried in air at room temperature. The inherent disadvantage of this process is that the sheet shrinks excessively and the extracted sheet, therefore, is generally only about 60 percent of the size of the unextracted sheet.

This disadvantage is overcome in the instant process by maintaining a fluid in the pores of the sheet throughout the extraction process and, if necessary, until it is ready for use.

In the present invention, it is critical to use polyolefin having a standard-load melt index of 0. Such a polyolefin is capable of producing products which are strong and flexible.

The standard-load melt index (SLMI) used herein indicates the rate of extrusion of the polyolefin as measured under the conditions specified in ASTM D 1238–57 T (Condition E). A high molecular weight polyolefin is more difficult to extrude than a low molecular weight polyolefin, and a standard-load melt index of 0 would indicate a relatively high molecular weight polyolefin.

The polyolefin component of the composition can be a mixture comprised of a high molecular weight polyolefin with a standard-load melt index of 0 and a compatible lower molecular weight polyolefin with a small standard-load melt index. Any amount of the lower molecular weight polyolefin can be used as long as such amount does not raise the standard-load melt index of the polyolefin mixture above 0. Ordinarily, the standard-load melt index of the lower molecular weight polyolefin will range from about 0.1 to about 5. Representative of the polyolefins of high and low molecular weight which may be used in the composition are polyethylene, polypropylene, polybutene, ethylene-propylene copolymers, ethylene-butene copolymers, propylene-butene copolymers and ethylene-propylene-butene terpolymers.

In addition to functioning as a means of imparting porosity to the sheet, the filler component of the composition functions to absorb and retain the plasticizer in the composition and should not be soluble in the plasticizer. The capacity of the filler particles to absorb and retain the plasticizer in the composition is proportional to its surface area. High surface area fillers are either materials of very small particle size or materials of a high degree of porosity. Generally, the size of the filler particles ranges from an average of about 0.01 micron to about 10 microns in diameter depending upon the pore size desired in the extracted sheet and the porous character of the filler. The surface area of the filler ranges from 30 to 950 square meters per gram. Preferably, the surface area of the filler should be at least 100 square meters per gram. Ordinarily, the filler is used in amounts ranging from about 5 to 60 volume percent of the composition. The specific amount of filler used depends primarily on its surface area and the amount of plasticizer used.

The filler component of the composition should be soluble in a conventional solvent. Representative of the fillers which are suitable for use in forming the sheet of the instant process are silicon oxide, aluminum oxide, calcium oxide, magnesium oxide, barium oxide, titanium dioxide, iron oxide, zinc oxide, tin oxide, calcium carbonate, magnesium carbonate, mica, asbestos, calcium silicate, molybdenum disulfide, and zinc sulfide.

Water-soluble fillers are especially suitable because of the ease of extraction. Illustrative of the water-soluble fillers are inorganic salts such as the chlorides of sodium, potassium, and calcium; acetates such as those of sodium, potassium, calcium, zinc and barium; sulfates such as those of sodium, potassium and calcium; phosphates such as those of sodium and potassium; nitrates such as those of sodium and potassium; carbonates such as those of sodium and potassium; and sugar.

In addition to functioning as a means of imparting porosity to the sheet, the plasticizer component of the composition improves the processability of the composition.

The plasticizer component of the composition should be soluble in a conventional solvent. Representative of the water-insoluble plasticizers are dibutyl sebacate, diisododecyl phthalate, zinc stearate, stearic acid, polyethylene glycol monostearate, polyethylene glycol distearate, epoxidized vegetable oil, tricresyl phosphate, petroleum oil, paraffin oil, wax, hydrocarbon resin, asphalt, eicosane, tall oil, linseed oil, and oxidized polyethylene wax.

Illustrative of water-soluble plasticizers are ethylene glycol, polyethylene glycol, polypropylene glycol, glycerol, and ethers and esters thereof; alkyl phosphates such as triethyl phosphate; polyvinyl alcohol; polyacrylic acid and polyvinyl pyrrolidone.

Stabilizers for the polymer can be included in the compositions of the present invention in conventional amounts to prevent thermal and oxidative degradation of the polyolefin component. Representative of the stabilizers are 4,4 thiobis (6-tert-butyl-m-cresol) ("Santonox"), and 2,6-di-tert-butyl-4-methylphenol ("Ionol").

The components of the composition can be mixed by any conventional manner which will produce a substantially uniform mixture. To produce a particularly uniform mixture, the components can be premixed at room temperature in a blender. Ordinarily, a satisfactory mixture is produced by fluxing the composition in a mixer such as a Banbury mixer or melt homogenizing the composition on a two roll mill.

The composition can be formed into a sheet in any conventional manner. For example, it can be extruded, calendered, injection molded or compression molded.

The extraction of the plasticizer and filler from the sheet can be done in any conventional manner. Generally, it is accomplished by immersing the sheet in a solvent in which the polyolefin component of the sheet is substantially insoluble.

The specific solvents and temperature used in extracting the plasticizer and filler from the sheet depend upon the specific component to be extracted.

Representative of solvents for extracting plasticizers such as petroleum oil are trichloroethylene, tetrachloroethylene, carbon tetrachloride, methylene chloride, tetrachloroethane, hexane, benzene, petroleum ether, toluene, cyclohexane, and gasoline.

Illustrative of solvents useful for extracting plasticizers such as polyethylene glycol are water, ethanol, methanol and acetone.

Examples of solvents suitable for extracting fillers such as silica are aqueous or alcoholic sodium hydroxide, potassium hydroxide, and hydrofluoric acid solution.

The extraction temperature can range from room temperature, i.e., about 25° C., to the melting point of the polyolefin component as long as the polyolefin does not dissolve.

The period of time required to carry out the extraction will vary depending upon the temperature used and the nature of the plasticizer or filler being extracted. The sheet is transferred from bath to bath while wet and not allowed to dry out.

The pore size of the microporous sheet depends on the particular material extracted. For example, the extraction of a plasticizer such as a hydrocarbon oil produces pores of a very fine size, i.e. 0.01–0.04 micron in diameter. On the other hand, the extraction of filler will produce pores which are substantially the size of the filler particles extracted. It has been found that the extraction of the filler component is accelerated by the presence of a conventional anionic or nonionic wetting agent in the solvent. Representative of such wetting agents is sodium alkyl benzene sulfonate, sodium lauryl sulfate and isooctyl phenyl polyethoxy ethanol. When extracting with an acid a cationic or nonionic surfactant can be employed, e.g., quaternary ammonium halides, polyether alcohols and polyols.

In carrying out the instant process, the solvent used for extracting the plasticizer is sometimes not miscible or soluble in the solvent used to extract the filler. In such cases, an intermediate solvent should be used in which the plasticizer solvent and the filler solvent are miscible or soluble. For example, if hexane is used as the plasticizer solvent and hydrochloric acid is used as the filler solvent, an intermediate solvent such as methanol, ethanol, isopropanol, or acetone in which both the hexane and the hydrochloric acid are miscible is used. In addition, when the extraction process is completed, the porous sheet should be immersed in an intermediate solvent if necessary to eliminate any solvent which may be immiscible or incompatible with the final liquid in which the porous sheet of the instant invention is used.

The wet extracted sheet may be used directly in a wet application such as a battery separator in an alkaline-type battery. It may also be dried and stored until it is ready for use.

The instant process is particularly effective for reducing shrinkage in the preparation of thin porous sheets, i.e. sheets having a thickness up to about 10 mils. However, the instant process is also operable in minimizing the shrinkage in thicker porous sheets.

The drawing shows a flow diagram of the process of the invention.

To determine the percent by volume of each component of the composition in the instant composition, the component is weighed and the volume is calculated from its specific gravity.

The invention is further illustrated by the following examples.

All parts and percentages used herein are by weight unless otherwise specified.

Tests used herein were made as follows unless otherwise noted:

Standard Load Melt Index (SLMI): Measured according to ASTM D 1238–62T using Condition E.

High Load Melt Index (HLMI): Measured according to ASTM D 1238–62T using Condition F.

Reduced Specific Viscosity (RSV): Measured according to ASTM D 1601–61 with a solution of 0.1 gram of the polymer in 100 cc. decalin at 135° C.

Density of Polyolefin: Measured according to ASTM D 1505–57T in g./cc.

EXAMPLE 1

A formulation of 19% by weight of 99% ethylene-1% butene copolymer having a standard-load melt index of 0, and a density of 0.95; 55% by weight of finely divided calcium carbonate ("Cal-O") having an average particle size of 0.10–0.35 micron; 25% by weight of petroleum oil ("Shellflex 411") 0.92 specific gravity, 547 SSU at 100° F.; and 1% by weight of stearic acid were added to a Banbury mixer. The antioxidant 4,4'-thiobis (6-tert-butyl-m-cresol) ("Santonox") was added to the Banbury mixer in an amount of 0.02 percent by weight of the ethylene-butene copolymer component and the mixture was blended until uniform. The mixture was then extruded on a one inch extruder provided with an eight inch sheeting die to form a sheet.

The sheet had a thickness of 2 mils and was more than 40 inches long. It was measured along its length and a distance from 0 to 40 inches was marked.

The sheet was immersed successively in the following baths which were at room temperature for a period of time of about two minutes in each bath:

| Bath No. | Bath | Remarks |
|---|---|---|
| 1 | Hexane | } Petroleum oil removed. |
| 2 | do | |
| 3 | 1:1 acetone:hexane acetone | } Intermediary baths to get the plasticizer solvent miscible with HCl solvent used for filler. |
| 4 | 1:1 water:acetone | |
| 5 | 36% concentrated hydrochloric acid solution containing 3% surfactant "B G–5" [1]. | |
| 6 | Water containing 3% by wt. surfactant "B G–5" [1]. | |
| 7 | Water containing 3% by wt. surfactant "B G–5" [1]. | |
| 8 | 35–45% by wt. aqueous potassium hydroxide. | |

[1] "B G–5" is a bio-degradable nonionic dark amber colored liquid containing 70% active ingredient having a pour point of 18° F., a Brookfield viscosity cps. at 25° C. (12 r.p.m.) of 1,900 and a density at 25° C. of 9.6 lbs./gal.

The resulting wet porous sheet was measured and the distance marked off from the 0 to the 40 inch mark measured about 37⅛ inches. Thus the total shrinkage was about 7.2 percent.

What is claimed is:

1. A process for forming a porous sheet having minimum shrinkage which comprises extruding a sheet from a fluxed mixture composed of 5 to 65 volume percent of polyolefin having a standard load melt index of 0, 5 to 60 volume percent filler particles, said filler particles having an average diameter of 0.01 to 10 microns, and the difference between the total amount of polyolefin and filler and 100 volume percent being plasticizer, the amount of plasticizer being at least 30% by volume, immersing the extruded sheet in a solvent for the plasticizer and extracting the plasticizer and thereafter immersing the resultant wet extracted sheet in a solvent for the filler and extracting the filler.

2. A process according to claim 1 wherein the polyolefin is a member of the group consisting of polyethylene, polypropylene, polybutene, ethylene-propylene copolymer, ethylene-butene copolymer, propylene-butene copolymer and ethylene-propylene-butene copolymer.

3. A process according to claim 1 wherein the plasticizer is selected from the group consisting of dibutyl sebacate, diisododecyl phthalate, zinc stearate, stearic acid, polyethylene glycol monostearate, polyethylene glycol distearate, epoxidized vegetable oil, tricresyl phosphate, petroleum oil, paraffin oil, wax, hydrocarbon resin, asphalt, eicosane, tall oil, linseed oil, oxidized polyethylene wax, ethylene glycol, polyethylene glycol, polypropylene glycol, glycerol, triethyl phosphate; polyvinyl alcohol, polyacrylic acid and polyvinyl pyrrolidone.

4. A process according to claim 1 wherein the filler is selected from the group consisting of silicon oxide, aluminum oxide, calcium oxide, magnesium oxide, barium oxide, titanium dioxide, iron oxide, zinc oxide, tin oxide, calcium carbonate, magnesium carbonate, mica, asbestos, talc, calcium silicate, silica gel, molybdenum disulfide, zinc sulfide, barium sulfate, sodium chloride, potassium chloride, calcium chloride, sodium acetate, potassium acetate, calcium acetate, barium acetate, sodium sulfate, potassium sulfate, calcium sulfate, barium sulfate, sodium phosphate, potassium phosphate, sodium nitrate, potassium nitrate, sodium carbonate, potassium carbonate and sugar.

5. A process according to claim 1 wherein said solvents are at room temperature.

6. The process according to claim 1 wherein intermittent between the plasticizer extraction and the filler extraction, the wet sheet is immersed in an intermediate solvent in which both the plasticizer solvent and the filler solvent are soluble.

7. The process according to claim 1 wherein subsequent to the filler extraction, the resulting wet extracted sheet is maintained in a liquid in which it is substantially insoluble.

References Cited

UNITED STATES PATENTS

| | | | |
|---|---|---|---|
| 2,707,201 | 4/1955 | Fernald et al. | 264—49 XR |
| 2,825,721 | 3/1958 | Hogan et al. | 260—88.1 |
| 3,066,356 | 12/1962 | Porter | 264—209 |
| 3,228,896 | 1/1966 | Canterino et al. | 264—49 XR |

FOREIGN PATENTS

| | | |
|---|---|---|
| 1,044,028 | 9/1966 | Great Britain. |
| 1,044,502 | 10/1966 | Great Britain. |
| 1,044,503 | 10/1966 | Great Britain. |

PHILIP E. ANDERSON, Primary Examiner

U.S. Cl. X.R.

136—146; 260—2.5; 264—176, 340, 344